United States Patent [19]

Wetteborn

[11] Patent Number: 5,455,669
[45] Date of Patent: Oct. 3, 1995

[54] LASER RANGE FINDING APPARATUS

[75] Inventor: Hainer Wetteborn, Waldkirch, Germany

[73] Assignee: Erwin Sick GmbH Optik-Elektronik, Waldkirch, Germany

[21] Appl. No.: 163,145

[22] Filed: Dec. 7, 1993

[30] Foreign Application Priority Data

Dec. 8, 1992 [DE] Germany ............... 42 41 326.5

[51] Int. Cl.⁶ ................................................. G01C 3/08
[52] U.S. Cl. ........................................................ 356/5.01
[58] Field of Search ........................ 356/4, 5, 4.01, 356/5.01

[56] References Cited

U.S. PATENT DOCUMENTS

| 4,632,543 | 12/1986 | Endo | 356/5 |
|---|---|---|---|
| 4,830,489 | 5/1989 | Cain et al. | 356/4 X |
| 4,950,075 | 8/1990 | Ichinose et al. | 356/4 X |
| 4,963,018 | 10/1990 | West | 356/4 X |
| 5,055,683 | 10/1991 | McCracken . | |
| 5,202,742 | 4/1993 | Frank et al. | 356/5 |
| 5,225,882 | 7/1993 | Hosokawa et al. | 356/5 |
| 5,323,223 | 6/1994 | Hayes | 356/5 |

FOREIGN PATENT DOCUMENTS

| 0404027 | 12/1990 | European Pat. Off. . |
|---|---|---|
| 0448111A2 | 9/1991 | European Pat. Off. . |
| 0448111A3 | 9/1991 | European Pat. Off. . |
| 0494027 | 7/1992 | European Pat. Off. . |
| 0510613 | 10/1992 | European Pat. Off. . |
| 0514065 | 11/1992 | European Pat. Off. . |
| 2302010 | 7/1973 | Germany . |
| 2906942 | 8/1979 | Germany . |
| 3228516 | 4/1984 | Germany . |
| 3415572 | 11/1984 | Germany . |
| 3441450 | 11/1985 | Germany . |
| 3423536 | 1/1986 | Germany . |
| 3637843 | 5/1988 | Germany . |
| 3700009 | 7/1988 | Germany . |
| 3730105 | 3/1989 | Germany . |
| 3840677 | 6/1990 | Germany . |
| 4002356 | 2/1991 | Germany . |
| 3932844 | 4/1991 | Germany . |
| 9113712 U | 2/1992 | Germany . |
| 4128012 | 2/1993 | Germany . |
| 4129751 | 3/1993 | Germany . |
| WO82/01420 | 4/1982 | WIPO . |
| WO90/02987 | 3/1990 | WIPO . |

*Primary Examiner*—Mark Hellner
*Attorney, Agent, or Firm*—Townsend and Townsend and Crew

[57] ABSTRACT

A laser radar has a pulsed laser (11) which controllably transmits light pulses (12) into a measurement region (13), a photoreceiver arrangement (22) which receives the light pulses (12') reflected back by an object (14) located in the measurement region (13), and an evaluation circuit which, taking account of the speed of light, determines a distance signal characteristic for the spacing of the object (14) from the time between the transmission and reception of a light pulse. Between the measurement region (13) and the pulsed laser (11) there is arranged a light deflecting device (15) which deflects the sequential light pulses at increasingly changing angles into the measurement region and simultaneously transmits to the evaluation circuit an angular position signal representative for its instantaneous angular position. The evaluation circuit derives the location of the object within the measurement region from the spacing signal and the angular position signal.

44 Claims, 9 Drawing Sheets

LASER RANGE FINDING APPARATUS

The invention relates to a laser range finding apparatus

BACKGROUND OF THE INVENTION

A laser range finding apparatus utilizes pulse transit time for determining a distance of an object within a measurement range is provided with a light deflecting device which enables directional scan of a measurement region for the location of objects in the measurement region.

The pulse transit time method for distance measurement is fundamentally known.

In a laser range finding apparatus utilizing pulse transit time for determining a distance of an object within a measurement range, directional location of objects is included. The device includes a pulsed laser which controllably sends light pulses of predetermined pulse duration into a measurement region; a photoreceiver arrangement which receives the light pulses reflected back from an object located in the measurement region; and, an evaluation circuit which derives a distance signal characteristic for the distance of the object from the pulsed laser from the pulse transit time between the transmission and reception of a light pulse utilizing the speed of light. The improvement herein includes a light deflecting device arranged between the measurement region and the pulsed laser for deflecting sequential light pulses with angular position into the measurement region together with means for simultaneously transmitting to the evaluation circuit an angular position signal representative for its instantaneous angular position. An evaluation circuit derives a location of the object within the measurement range from the distance signal and the angular position signal.

The object of the present invention is to use this pulse transit time method for the determination of the position of objects in spatial regions, for example in connection with the security of driverless transport systems and also the general securing of regions.

The invention thus provides a laser radar by means of which not only the spacing of the object hit by the pulsed light from the apparatus can be determined, but rather also the angle at which the object is arranged relative to some basic direction in space.

The light deflecting device has an angular scanning range greater than 90°, and smaller than 270°, and preferably around 180°. The pulsed light beams define a preferably horizontal scanning plane. The pulse duration of the light pulse is short relative to deflection between the sequential light pulses of the light deflecting device enabling the light deflecting device to be approximated as stationary by the evaluation circuit. angular range of approximately 1° is swept over by the light deflection device in 50 to 150, and in particular in 100 µs. If, on the other hand, a light pulse with short duration is transmitted approximately every 50 µs then this signifies that a light pulse is transmitted approximately every half a degree, or 360 pulses over a total scanned range of 180°. This is fully sufficient for the required angular resolution in the safety region.

The time between two transmitted light pulses of approximately 50 µs is exploited for the tests described further below.

Of particular advantage are embodiments of the light deflecting device. For example, the light deflecting device (15) includes a preferably flat rotary mirror. This mirror is rotable about one of the incident light beams. The axis of rotation extends at an angle between 30° to 60° and preferably 45° to the surface of the rotary mirror. It is preferred that that the rotary mirror be of a disc shape.

The rotary mirror receives transmitted pulses, essentially from above, and radiates those pulses essentially horizontally. A transmitter lens is formed in front of the laser.

The light deflecting device serves the dual purpose of receiving the returned pulse light, and deflecting it to a photoreceiver arrangement. In the preferred embodiment, the transmitted pulse light beam and the received pulse light beam are coaxial to one another. The transmitted pulse light beam is in a central region of the mirror, while the peripheral region of the mirror has the received and returned light beam.

The photoreceiver arrangement includes a receiver lens which concentrates the received light onto a photoreceiver. This lens is arranged so that it can pick up light incident on the peripheral region of the rotary mirror. An interference filter, tuned to the spectrum of light transmitted by the pulsed laser, is arranged at the input of the photoreceiver. The light deflecting device preferably sweeps through 360° and continuously rotates in one direction of rotation. The speed of rotation is between 1,000 to 3,000 rpm and preferably is at 1,500 rpm. To track the rotation, a device is utilized which indicates the instantaneous angular position of the rotary plate. In this way a scanning of a desired spatial region is ensured in a constructionally compact and optically very effective manner, with the scanning angle going up to 360° but normally however only amounting to 180°.

A particular advantage in this respect is the concentric construction of the transmitted and received pulsed light beams. In this way, a clean geometrical beam separation is in particular achieved as well as sensitivity in the close range.

The speeds of rotation are particularly advantageous, since in this way, in conjunction with the pulse repetition frequencies that are used, one obtains an adequate angular and temporal resolution.

In connection with the subsequent embodiments the use of a computer is of particular significance. In this way, the diverse self-monitoring functions of the system can in particular be realised.

The further embodiments of the invention ensure a distance resolution of 5 cm/bit which is fully sufficient for the envisaged monitoring purposes, with one bit being defined by one or a half period of the clock frequency. According to this aspect, the evaluation circuit includes a counter with a preferably fixed pre-set clock frequency. The counter starts on transmission of a light pulse, and stops upon the reflection of that light pulse being received. The clock operates with a frequency in the range of 0.5 to 3 gigahertz, and more preferably at 1.5 gigahertz.

The count is taken by two asynchronous individual counters. One counter responds to positive halfways. The other responds to negative halfways. The two counters are added, and the total of the addition utilized to measure distance.

It is, however, of particular advantage that fault monitoring can be carried out by the use of two individual counters connected in parallel. The sum of the individual counts of the counters is compared with twice the count of one of the counters. Error can be indicated by a difference of more than one bit. This comparison can be carried out after each light pulse is sent and received. Alternately, the comparison can be carried out between the end of one scan and the start of the next scan of a particular scanning range.

A further error test is possible in the pause between two scans of the angular scanning range. In this case, the computer delivers controlled counting pulses to the individual counters, checks the results of the count, and transmits a false signal when the results of the count do not correspond with the input number of count pulses.

Furthermore it is advantageous when, the noise level which is superimposed on the useful pulse signal is taken into account, since both the brightness in the monitored rooms and also the degree of reflection of the monitored articles can fluctuate greatly.

A further advantageous embodiment is included in noting the maximum of a received light pulse, and compensating the measured time in accordance with a correction value, which is related to the maximum value of the received pulse. A measurement accuracy of up to 5 cm/bit can in particular be achieved by this further development of the invention.

An inserted light reflecting or scattering test body, the sensitivity of the photoreceiver arrangement can be measured with respect to a predetermined boundary value. Errors in the transmission and reception system of the apparatus can be found.

It possible to check the problem-free functioning of the preferably used avalanche reception diode. Further, a luminescent diode in the path of the transmitted pulsed light beam can be utilized to have the computer check during the sweeping of the luminous diode, whether the signal-to-noise ratio is at least the same as a predetermined boundary value.

The apparatus of the invention is expediently located in a housing which is closed off in the region of the exit of the transmitted pulsed light beam and of the received pulsed light beam by a front disc curved in accordance with the scanning.

In order to be able to automatically recognise contamination of this front disc which is dangerous for the function of the apparatus and to transmit a contamination error signal in the event of excessive contamination, the apparatus can expediently be constructed. With the front disc crossed at a plurality of points along its periphery by beams of light barriers, which emerge from light transmitters. The light transmitters are arranged in the region of one and face of the front disc, and are received by light receivers arranged in the face of the other disc. The light transmitters and receivers are connected to a computer via multiplexers for sequential control. Pulses and evaluation of received pulses enable the computer to transmit an error signal when the received pulses have dropped below a predetermined value.

The front disc extends obliquely from the top downward in the direction of the rotary mirror. This disc is preferably angled at its lower end. This brings about a double passage of the light barrier beam through the front disc for complete sampling of the state of the front disc. The inclined positioning of the main part of the front disc thereby simultaneously serves to reflect away the disc surface reflection.

As a result of contaminations in the form of a liquid film on the front disc, and in particular an oil film, which do not or only insubstantially impair the passage of light can trigger a contamination signal in that the characteristic of such films is exploited that they also form a smooth surface when they are applied to a rough background. As a result of technical safety requirements at least two oil measurement channels should be provided in order to also detect in an electronic evaluation circuit that one of the light transmitters or receivers has failed.

All desired navigation and error signals can be converted in suitable manner and tapped off via an interface.

The special advantage of the laser radar apparatus of the invention lies in the fact that it is secured against any form of system error. This applies both for errors in the optical region or also in the electronic evaluation circuit.

BRIEF DESCRIPTION OF THE DRAWINGS

The invention will be described in the following by way of example with reference to the drawing in which are shown.

DESCRIPTION OF THE PREFERRED EMBODIMENTS

Figure 1:
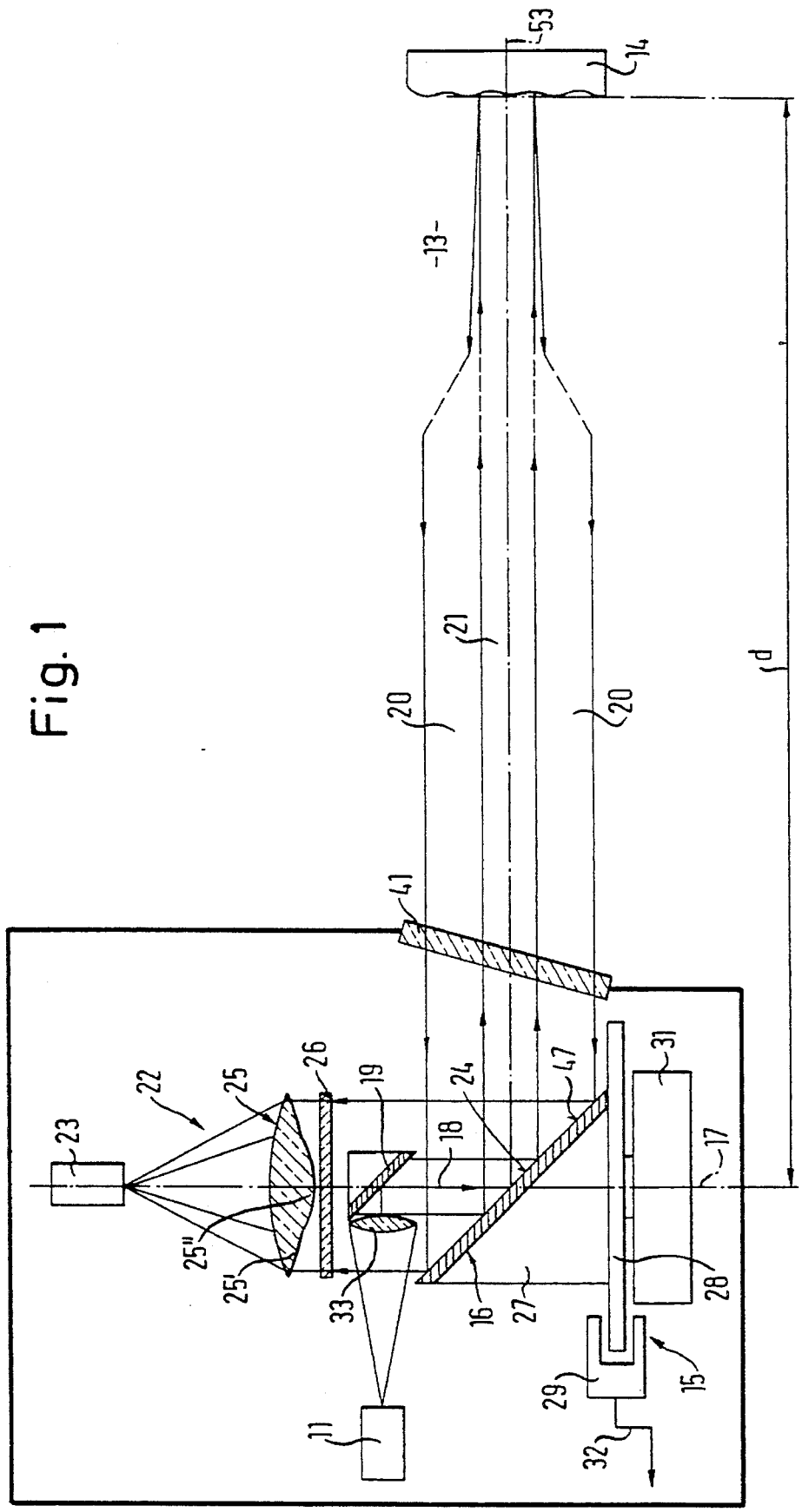
FIG. 1 is a schematic view of a laser radar in accordance with the invention.

In accordance with FIG. 1 a motor 31 drives a horizontal rotary plate 28 to execute a continuous rotating movement about a vertical axis 17. At the periphery of the rotary plate 28 there is located an angular transducer 29 which is formed as a fork light barrier and is connected via a line 32 (see also FIG. 3) to a control stage 40 within the associated evaluation circuit.

On the rotary plate 28 there is arranged a right cylindrical body 27 in such a way that its upper end face formed as a rotary mirror 16 is arranged at an angle of 45° to the axis of rotation 17. The rotary mirror 16 can also be formed in non-illustrated manner on a mirror plate which is secured to the rotary plate 28 via a mirror carrier.

Above the rotary mirror 16 there is located a substantially narrower deflecting mirror 19, which is likewise a plane mirror, the mirror surface of which has an angle of 45° to the axis of rotation 17 and which can also be realised as a right cylindrical body.

Figure 4:
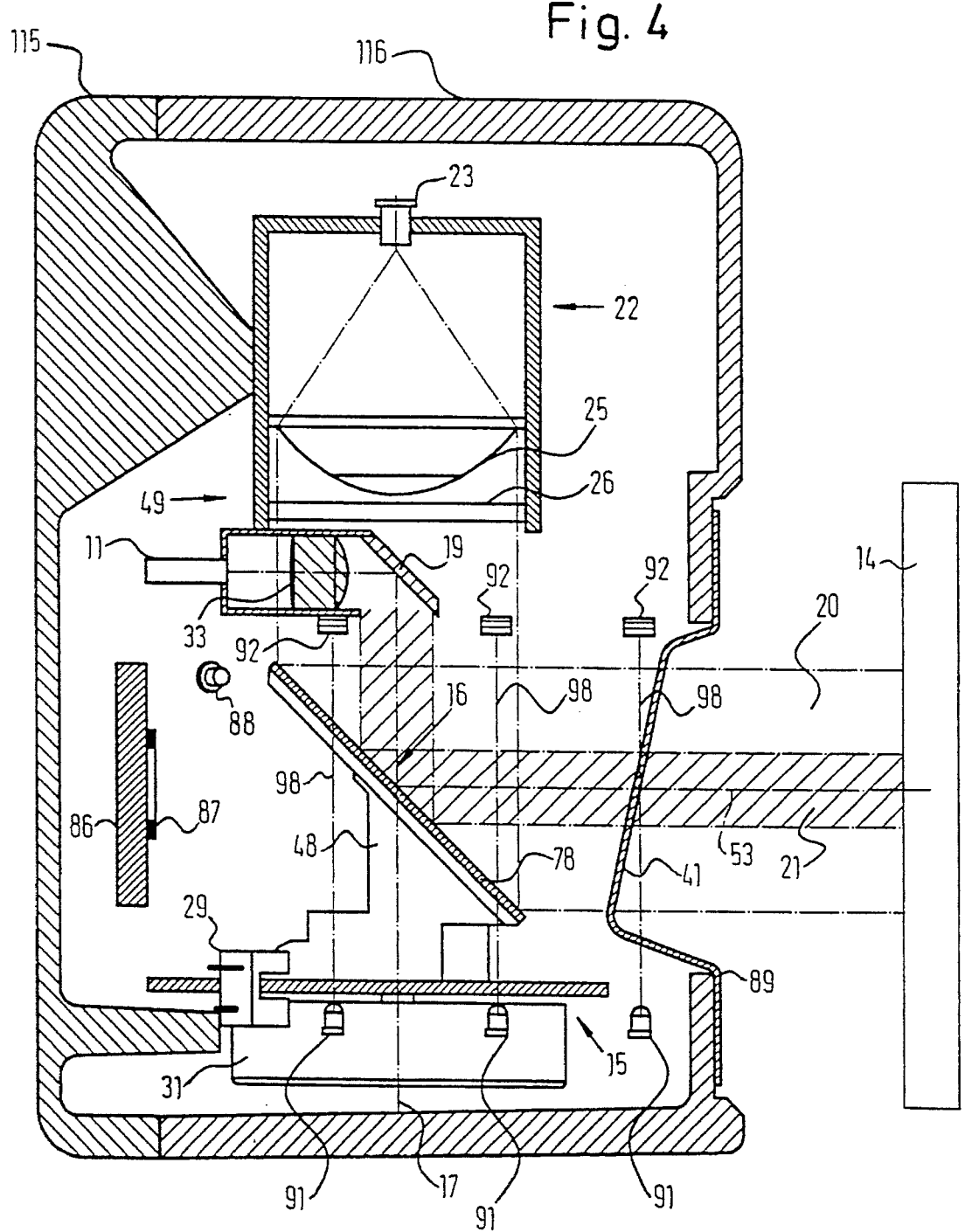
FIG. 4 is a detailed cross-section of the laser radar of FIG. 1.

In accordance with FIG. 4 the deflecting mirror 19 is also formed as a flat mirror plate. A central region 24 of the rotary mirror 16 receives light of a pulsed laser 11 via a transmission lens 33 and the deflecting mirror 19. The initially horizontal light beam is deflected downwardly at the deflection mirror 19 in order to then be deflected by the rotary mirror 16 in a horizontal direction to the front disc of the apparatus. From there the transmitted light beam 21 enters into the measurement region 13 in which, for example, a light reflecting object 14 is assumed to be present, from which scattered light passes as a received light beam 20 through the front disc 41 back to the rotary mirror 16 in the sense of an auto-collimation beam path. The received light 20 is incident to the side of the central region 24 on which the transmitted light beam 21, and in particular the central incident ray 18 are incident, onto an annular region 47 of the rotary mirror 16 in order to be reflected past the reflecting mirror 19 to an interference filter 26 behind which there is located a receiving lens 25 which has regions 25', 25" of different focal length in order that objects arranged very close to the apparatus can also be recognised in troublefree manner.

Figure 2:
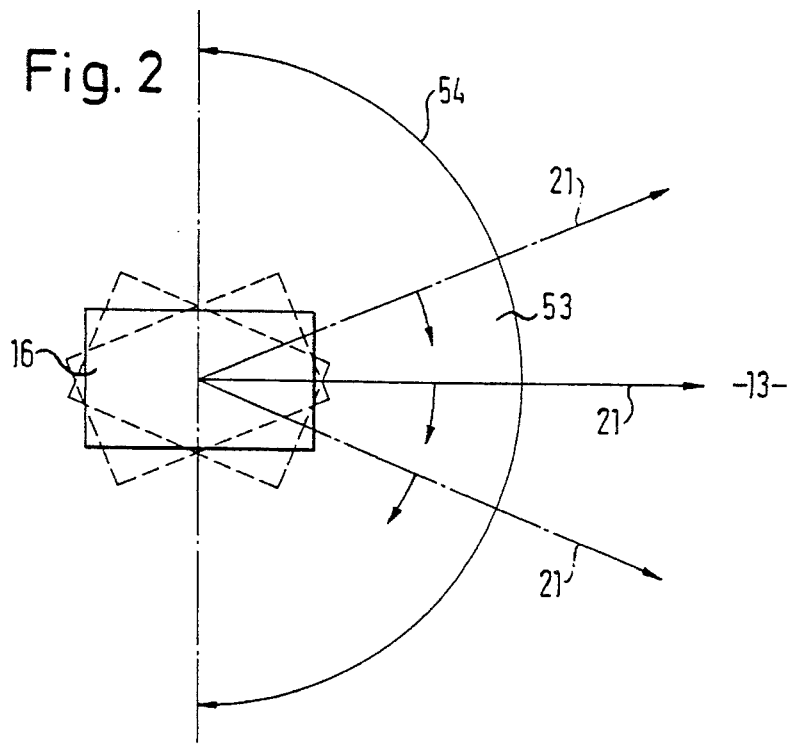
FIG. 2 is a schematic plan view of the rotary mirror of FIG. 1 and the angular scanning range.

The receiver lens 25 concentrates the received light onto a photoreceiver 23 and forms, together with the photoreceiver 23, a photoreceiver arrangement 22. The rotary mirror 16, the rotary plate 28 and the motor 31 jointly represent a light deflecting device 15 which allows the transmitted pulsed light beam 21 and the received pulsed light beam 20 to rotate around the axis 17. In this manner, an angular scanning range of up to 360° can be realised. In accordance with FIGS. 2 and 5, the front disc 41 however extends only over an angle of approximately 180°, which is for example sufficient for the complete monitoring of the region located in front of a vehicle. In FIG. 2 two further angular positions of the rotary mirror 16 and of the transmitted pulsed light beam 21 are also illustrated as well as the plan view of FIG. 1. The transmitted pulsed light beam 21 which executes an angular scan defines a scanning plane 53. The maximum angular scanning range 54 extends, in accordance with FIG. 2, over 180° degrees.

Figure 3:
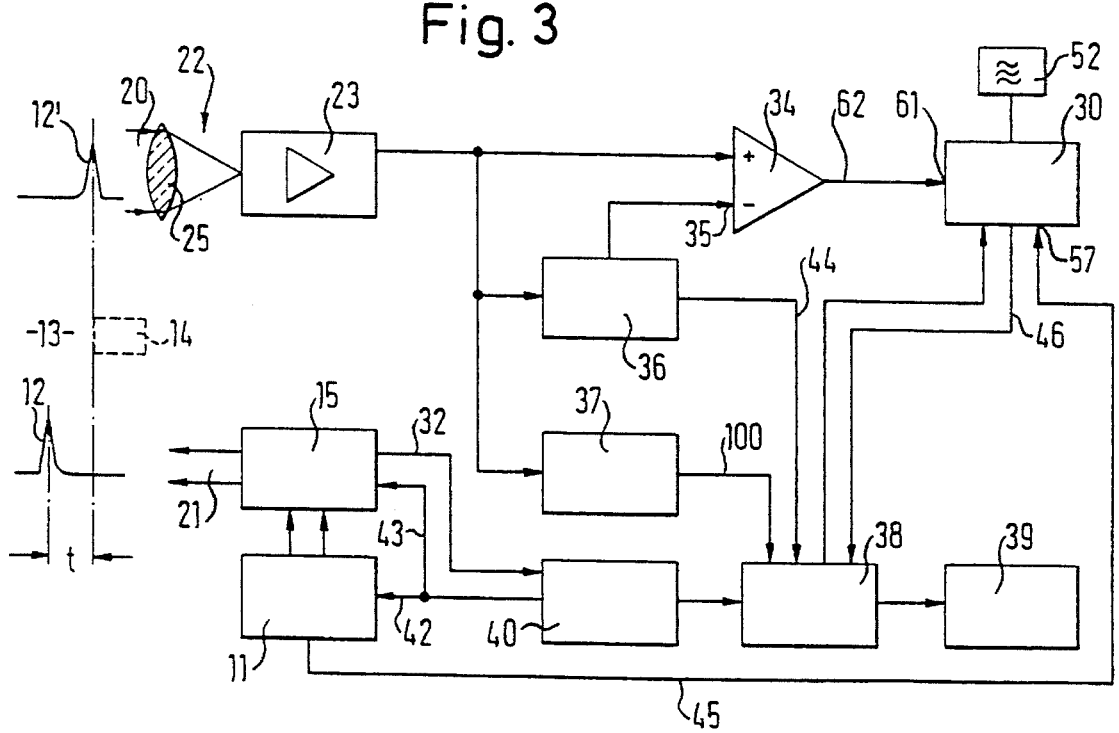
FIG. 3 is a block circuit diagram of the laser radar of the invention.

In accordance with FIG. 3 the control stage 40 causes, via lines 42, 42, the pulsed laser 11 to transmit light pulses of a duration of 3 to 4 ns as well as the rotation of the light deflecting device 15, with a speed of rotation of 1500 r.p.m. The angular position of the light deflecting device 15 is communicated to the control stage 40 at each instant from the angular transducer 29 via the line 42. Light pulses 12 are transmitted into the measurement region 13 via the transmitter lens 33 and the mirrors 19, 16 (FIGS. 1, 4). After a transit time t they are received by the photoreceiver arrangement 22 as received pulses 12'(FIG. 3). The photoreceiver 23, in particular an avalanche diode, forms from this a corresponding electrical signal which is applied via a comparator 34 to a counter 30 which is clocked from a frequency generator 52. The output of a noise level measuring device 36 is passed to the reference input 35 of the comparator 34, the other input of which is likewise connected to the output of the photoreceiver arrangement 22. The noise level measuring device 36 also indicates the respectively prevailing noise level to a computer 38 via a line 44.

The output of the photoreceiver 23 is moreover applied to the input of a peak value detector 37, the output of which is likewise applied to the computer 38.

From the pulsed laser 11 a control line 45 leads to the counter 30 in order to trigger this each time a light pulse is transmitted. As soon as the light pulse 12' is received by the photoreceiver arrangement 22, the counter 30 is stopped as a result of the connection to the photoreceiver arrangement 22 via the comparator 34. The result of the count is then communicated to the computer 38 via the control line 46. The computer derives from this the transit time t and computes the spacing d of the object 14 in accordance with the formula $$d = c \cdot t/2 \tag{1}$$

where c is the speed of light.

As the computer 38 knows the instantaneous angular position of the light deflection apparatus 15 via the line 32 and the control stage 40 an information concerning the polar coordinates of the object 14 can now be passed on to the interface 39 where this signal is available for further use, for example as a navigation signal or as an error signal.

The manner of operation of the described apparatus is as follows:

When the rotary mirror 16 is driven by the motor 31 to execute a continuous rotary movement, the control stage 40 causes the pulsed laser 11 to transmit a light pulse 12 of 3.5 nanoseconds duration. The light pulse is transmitted into the measurement range 13 via the light deflecting apparatus 15 and, in accordance with FIG. 1, is reflected from an object 14 which is only indicated in broken lines in FIG. 3, so that finally a received pulse 12' enters into the receiver arrangement 22. In this manner, the light reaches the photoreceiver arrangement after a light transit time of 2·d/c, where d is the spacing of the object 14 from the apparatus and c the speed of light.

The time t between the transmission and reception of the light pulse is measured with the aid of the time interval counter 30. On transmitting the light pulse 12 the counter is triggered via the control line 45 and is stopped again by the photoreceiver 23 via the comparator 34 on receiving the light pulse 12' which moves to and for over the measurement range 13. With a time resolution of the counter of 330 ps a distance measurement accuracy of 5 cm results.

The task of the noise level measuring device 36 is to control the detection threshold in dependence on the received noise level. This control ensures a constant false alarm rate with varying illumination situations and object reflection factors. The noise level measuring device 36 makes available a trigger threshold at the reference input 35 of the comparator 34 which ensures that, for example, only those received light pulses 12' trigger a count signal at the comparator 34 which are seven times as large as the noise level shortly before the appearance of the light pulse 12'. The noise level measuring device 36 continuously forms an average value of the received signal over a time which is very much larger than the length of an individual light pulse. The average forming time is, however, substantially shorter than the time spacing between two sequential transmitted light pulses 12 which amounts, for example, to 50 μs.

In this manner the transmitted measurement light pulses 12 have no influence on the average value, and, on the appearance of a received light pulse 12' at the input of a comparator 34, the noise level measuring device 36 makes a trigger threshold available at the reference input 35 which—multiplied with a factor of, for example, 7—is representative for the statistically maximum noise level present directly prior to the arrival of the received light pulse 12'.

Figure 6:
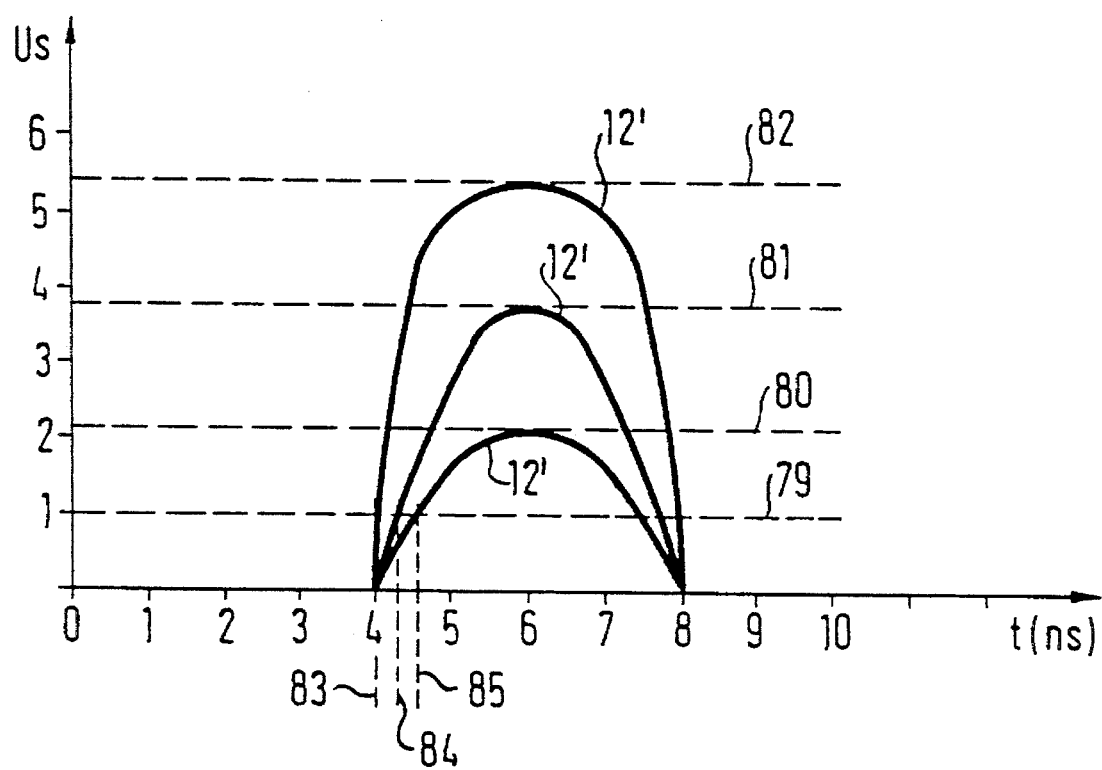
FIG. 6 is a signal voltage-time diagram of received light pulses for different strengths of light.

The task of the peak value detector 37, which is built up from a chain of rapid ECL-comparators with self-holding, is the generation of correction values for the compensation of time measurement errors which arise as a consequence of the signal dynamics, which is explained in the following with reference to FIG. 6. In FIG. 6 three different received light pulses 12' are shown arriving at the photoreceiver arrangement 22 of FIG. 3 and achieve a maximum signal voltage of 80, 81 and 82 respectively. As a result of a correspondingly lower noise level all received light pulses 12' admittedly exceed the trigger threshold 79 set by the noise level measuring device 36 at the reference input 35 of the comparator 34, however the time t at which the rising flank of the three different received light pulses exceeds the trigger threshold 79 is different. In the illustrated example the time difference can amount to up to 1.2 ns which corresponds to a measurement error of ca. 20 cm.

In accordance with the invention, the time measurement errors (for example 84, 85 for the maximum signals 80, 81) relative to the base time 83 which is assumed for the largest prevailing maximum 82 are stored in the computer 38 where they are available for correction values.

The peak value detector 37 determines whether the signal voltage $U_s$ arising at the output of the photoreceiver 23 is located within one of, for example, six preset signal steps 1 to 6 and gives a corresponding signal to the computer 38 via the control line 100 where the corresponding correction value (for example 84 or 85) for the actually determined signal voltage is called up and from this a corrected time signal is derived.

In this manner, corresponding measurement errors are eliminated and an accuracy of, for example, 5 cm/bit is achieved as a whole.

The time error elimination by means of the peak value detector 37 is important because the total measurement range of the apparatus of the invention lies at 4 m, so that, for example, the measurement error of 20 cm can normally no longer be tolerated.

As the control stage 40 controls the pulsed laser 11 and the light deflection device 15, the computer 38 can associate each angular position of the light deflecting apparatus 15 with a range measurement value. The evaluation of the measurement data in the computer 38 consists in the monitoring of a protective field 122" which has previously been stored in polar coordinates, for example as is schematically illustrated in FIG. 12 in front of the laser radar 121 in accordance with the invention mounted at the front side of a vehicle 120 for example a driverless, self-steering vehicle 120. Whenever the protective field 122" recognises the edge of the carriageway 101 detected by the laser radar 121, or some other obstacle 123 (FIG. 11), then a corresponding counter-steering movement can be initiated, with the sector S1 to S16 where the obstacle is located being determined.

Figure 10:
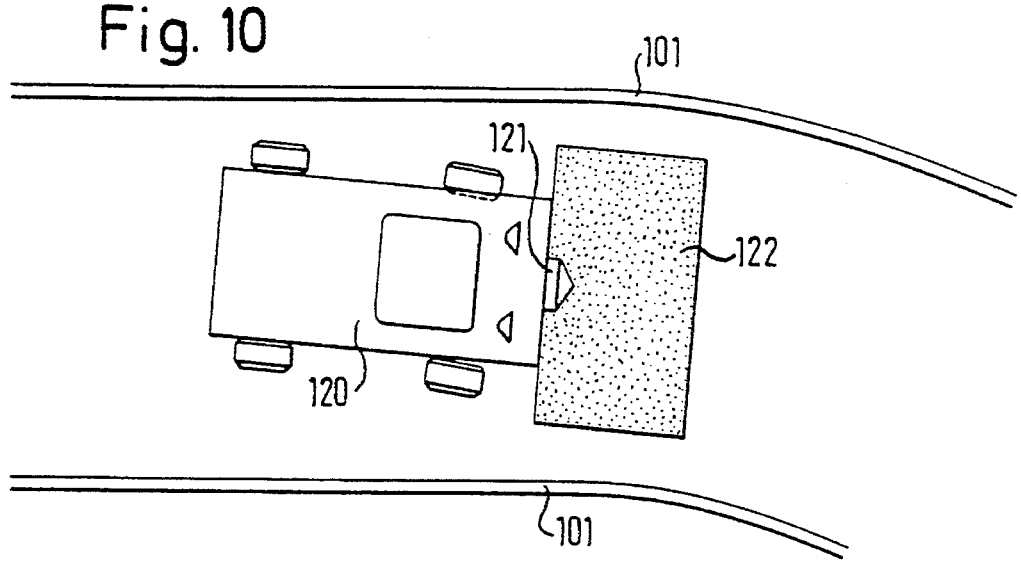

FIG. 10 shows the simplest application with a self-steering vehicle 120 equipped at the front side with a laser radar 121 in accordance with the invention, with the protective field 122 responding to two carriageway boundaries 101. As soon as the protective field 122 detects one of the boundaries 101 the laser radar 121 initiates a counter-steering movement.

Figure 11:
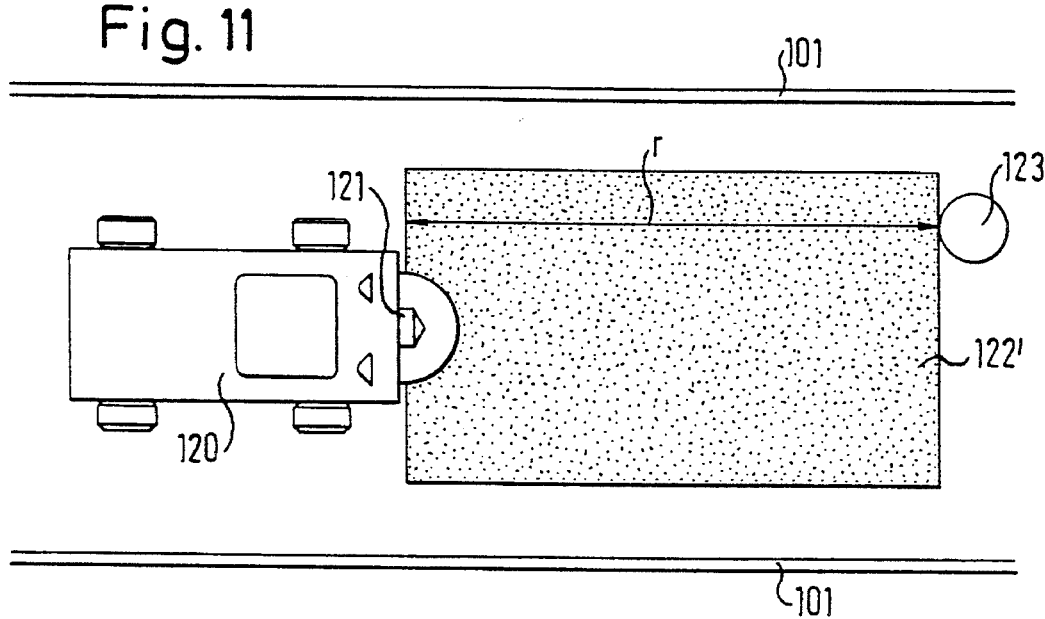
Figure 12:
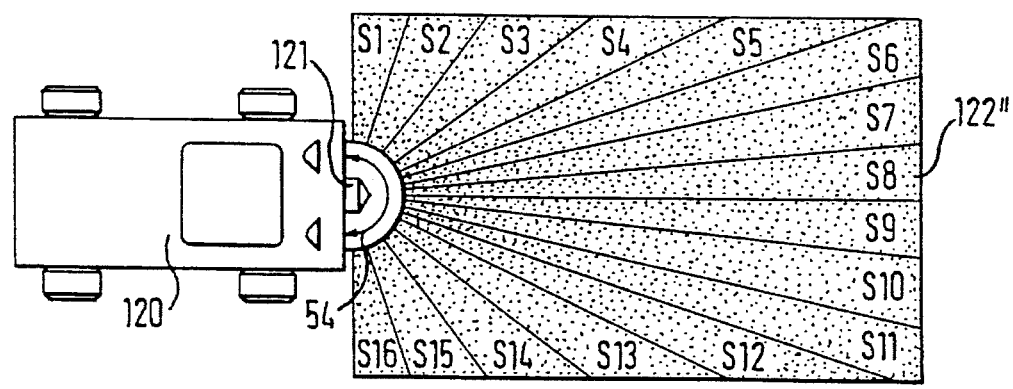

FIG. 11 shows an example where the protective field 122' in front of the laser radar 121 arranged at the front side of a vehicle 120 is so set in accordance with the invention that it reacts to obstacles 123 located at a predetermined range r, for example, by a switching or braking signal.

In accordance with FIG. 12 the protective field 122" in front of the vehicle 120 is so differentially designed that different critical distances S1 to S16 can be provided for different angle sectors, so that not only obstacles are recognised, but rather also their angle and their spacing relative to the location of the laser radar 121 can be determined.

Figure 13:
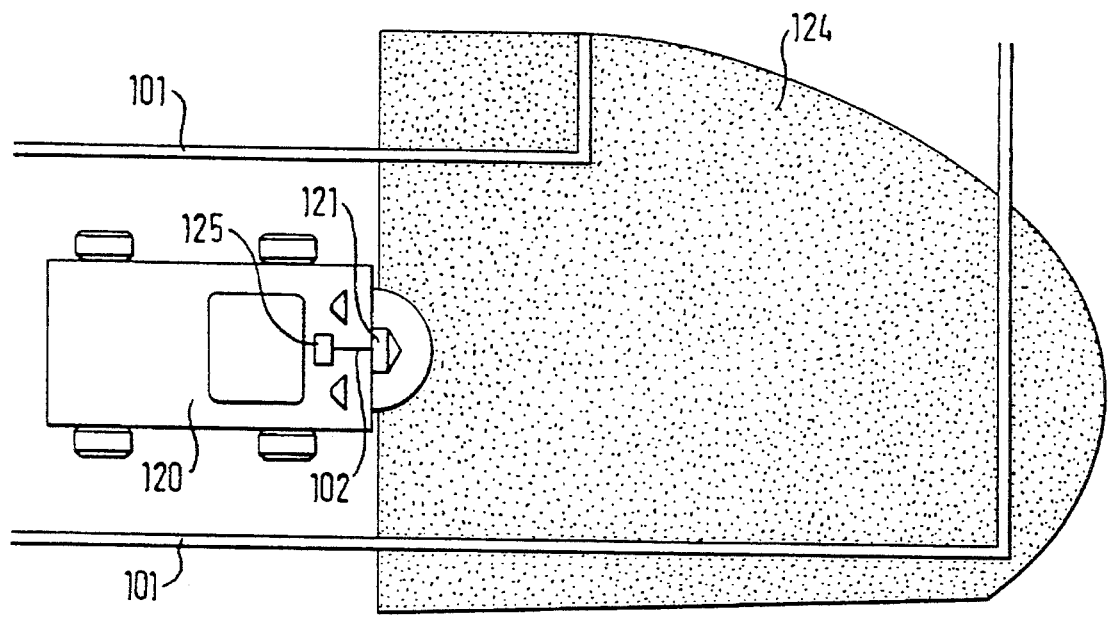

FIG. 13 shows a self-navigating vehicle 120, the navigation apparatus 125 of which is connected with the laser radar of the invention via an information line 102, whereby the laser radar 121 can from time to time be corrected to the actual status at positions where the coordinates of the environment are known.

Figure 14:
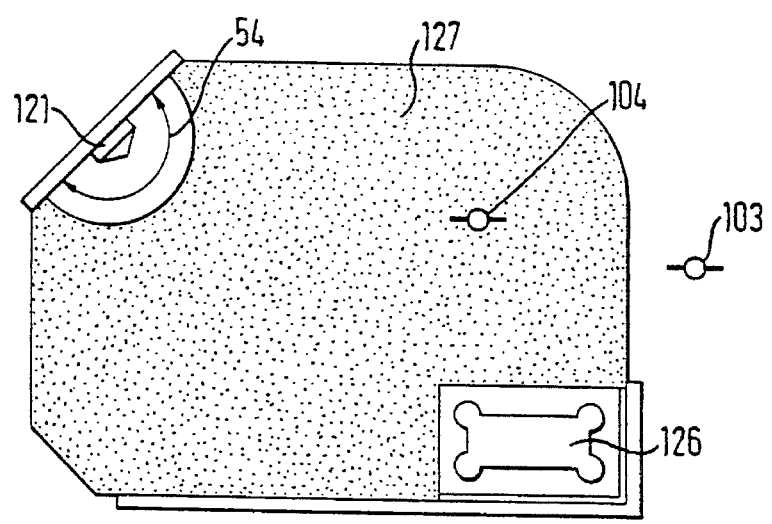

The use shown with reference to FIG. 14 consists in that the laser radar apparatus 121 of the invention defines an approximately rectangular, range restricted, protective range 127. The laser radar is arranged at the one corner of the rectangle so that the angular bisector of the angular scanning range 54 lies approximately along the diagonal of the rectangular protective range. In the diagonally oppositely disposed corner region there is located a dangerous working machine 126, in front of which people who approach the machine should be protected by the laser radar apparatus 121 of the invention. Important in this respect is that the protective range 127 can be so restricted by the laser radar apparatus 121 of the invention that a person located at a non-dangerous position at 103 is not recognised although they are located in the angular scanning range 54, whereas a person located, for example at 104 at an endangered position is recognised, which then for example leads to switching off of the dangerous working machine 126.

The laser radar of the invention has a range of 4 to 6 m and a resolution of better than 7 cm. The detection time amounts to ca. 4 ms and the detection angle is in all cases 180°.

At the interface 39 (FIG. 3) an obstacle range signal r is for example generated in the case of the use in accordance with FIG. 11, and can be used for example for a stop signal in the vehicle 120.

In the embodiment of FIG. 12 a minimum range signal can be set for each sector S1 to S16.

With the navigation aid of FIG. 13 one can operate with a measurement rate of 360 measurements in 40 ms. The lateral resolution can in all cases amount to 0.5° whereas the range resolution can be reduced to ±5 cm.

The range restricted protective region 127 of FIG. 14 can amount to 3 to 4 m, with the detection time 80 then being 80 to 120 ms at a resolution of 5 cm.

Figure 5:
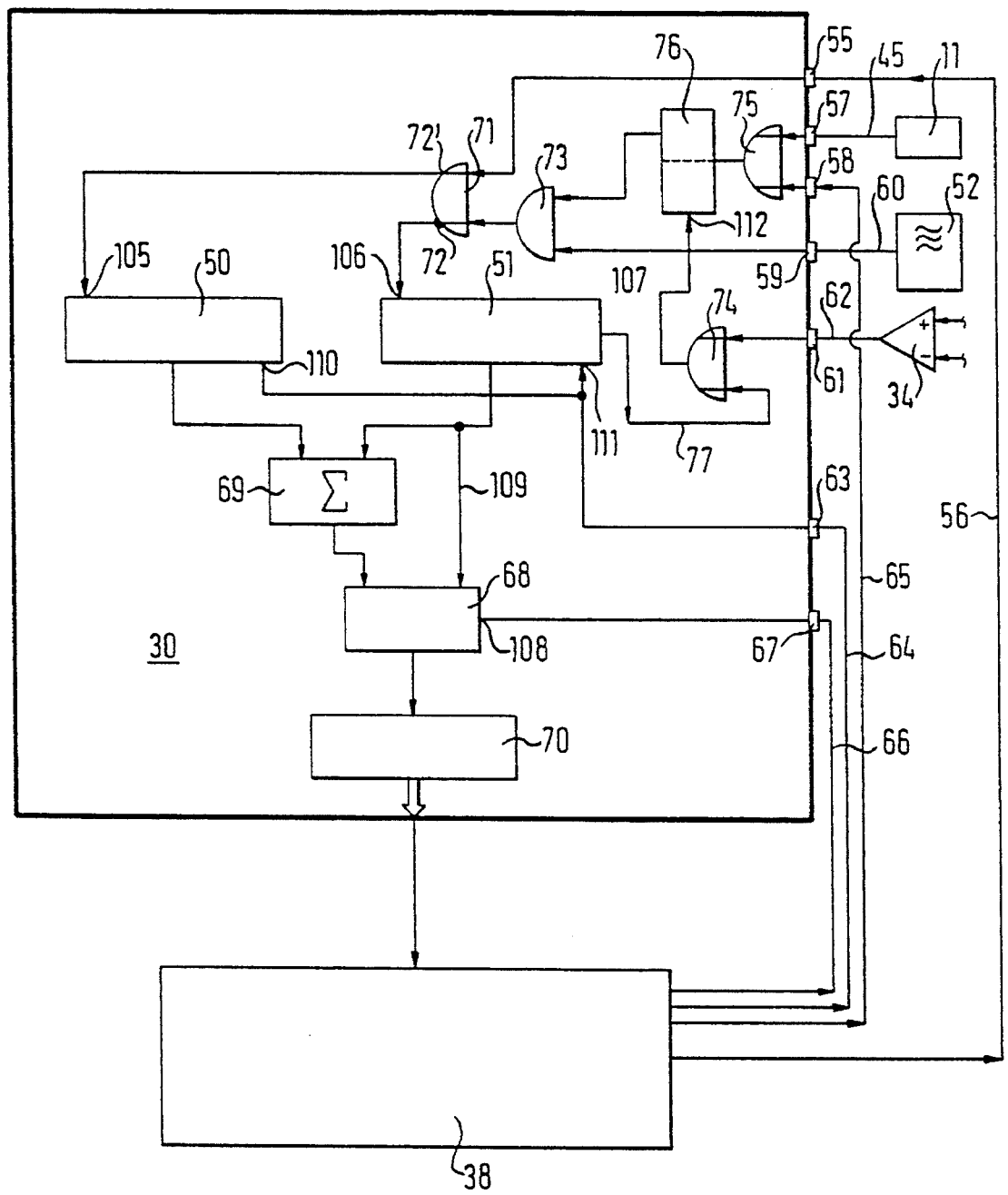
FIG. 5 is a block circuit diagram of the counter preferred in accordance with the invention together with the components connected thereto.

In accordance with the invention, the counter 30 is built up of two asynchronous individual counter chains, in each case one counter is incremented in response to the positive flank of the 1.5 GHz clock signal and one counter is incremented in response to the negative flank of the 1.5 GHz clock signal, so that by addition of the the two counts a resolution of 330 ps results. How this takes place in detail will be explained in the following:

In accordance with FIG. 5 the counter 30 of the invention contains two asynchronously operating individual counters 50, 51, the clock inputs 105, 106 of which are controlled via an OR-gate 71. It is important that the output 72 for the clock input 106 of the individual counter 51 is inverted relative to the output 72' for the clock input 105 of the individual counter 50. The two inputs of the OR-gate 71 are connected via test count pulse input 55 to the computer 38 and to the output of an AND-gate 73 respectively, with the two inputs of the AND-gate being connected to the switching output of a flip-flop 76 and to a hyper frequency voltage input 59 to which is applied a hyper frequency voltage of 1.5 GHz from the frequency generator 52.

The switching input of the flip-flop 76 lies at the output of an OR-gate 75, the one input of which is acted on via the line 45 (see also FIG. 3) from the pulsed laser 11, whereas the other input is acted on by a test start-input 58 which is connected via a control line 65 with the computer 38.

The output of the comparator 34 (FIG. 3) is applied in accordance with FIG. 5 via the line 62 to the measurement stop input of the counter 30 which in turn stands in connection with the one input of an OR-gate 74. The other input of the OR-gate 74 is connected with the overrun output 107 of the second individual counter 51.

From the computer 38 a control line 66 leads further to a multiplexer switching input 67 which is connected with the switching input 108 of the multiplexer 68.

The count output signals of the individual counters 50, 51 are applied to the two inputs of an addition stage 69 which forms the sum of the two input count signals and leads this to an output stage 70 via the multiplexer 68.

The count signal of the second individual counter 51 is also applied directly via the control line 109 to a second input of the multiplexer 68. Via the control input 108 the output of the addition stage 69 or the output of the second individual counter 51 can be selectively switched through to the output stage 70.

The test count pulse input 55 is controlled from the computer 38 via a control line 56. The test start input 58 is likewise acted on by the computer 38 via a control line 65.

The two individual counters 50, 51 furthermore have reset inputs 110, 111 which are controlled from the computer 38 via a reset input 63 and a control line 64.

With the counter 30 explained with reference to FIG. 5 the following functions are carried out during the operation of the laser radar apparatus of the invention:

While the rotary mirror 16 sweeps over the useful angular scanning range 54 (FIGS. 2, 14, 16) each light pulse 12 given off by the pulsed laser 11 initiates at the instant of its transmission a switching over of the flip-flop 76 via the line 45 and the OR-gate 75, so that the attached AND-gate 73 transmits the hyper frequency voltage of 1.5 GHz applied to its other input to the OR-gate 71. From there, the hyper frequency voltage now passes to the count inputs 105, 106 of the individual counters 50, 51, with the count signal reaching the count input 106 of the second counter 51 being phase-displaced by 180° relative to the count signal at the input 105 as a result of the inverted input 72 of the OR-gate 71. In other words, the counter 50 counts the rising flanks of the positive half waves, the individual counter 51 counts the falling flanks of the negative half waves. In this way, during each period of the hyper frequency voltage two bits are generated from the frequency generator 52 by the individual counters 50, 51, and indeed, respectively displaced by 180°.

The counting of the half waves of the hyper frequency voltage from the frequency generator 52 is now continued until a light pulse 12' (FIG. 3) is received from the photo-receiver arrangement 22 and a stop signal is transmitted to the reset input 112 of the flip-flop 76 via the comparator 34, the line 62, the measurement stop input 61 and the OR-gate 74. Thereafter, the flip-flop 76 is set back into its initial state, whereupon the AND-gate 73 is blocked and separates the hyper frequency generator 52 from the OR-gate 71. In this way the count of the individual counters 50, 51 is stopped and the computer 38 to which this has been indicated via the line 46 (FIG. 3) can now not only call up the measured counts after summation in the addition stage 69 via the multiplexer 68 and the output stage 70, but can also additionally carry out two tests.

Since two bits are generated during each period of the hyper frequency voltage, a temporal resolution of the transit time measurement t of 330 ps is achieved at a frequency of 1.5 GHz and thus a range measurement accuracy of 5 cm/bit.

Since in this manner a transit time measurement has taken place, the computer 38 switches the multiplexer 68 over via the control line 66 and the multiplexer switching input 67, so that the multiplexer 68 can now transmit the count of the second counter 51 via the line 109 to the computer 38. There, a comparison of the sum output signal of the addition stage 69 with the doubled count of the second counter 51 takes place. If all components have operated without problems then the two count values may differ by at most 1 bit. If this is found by the computer 38 then it is a sign that all components have operated in troublefree manner. If, however, this comparison leads to a difference of a plurality of bits, then the computer 38 generates an error signal and, for example, stops the dangerous working machine 96 of the FIG. 16.

The above-named test can for example be carried out after each received light pulse 12' and the corresponding evaluation carried out once. In general, it is however sufficient if a test of this kind is carried out once after a complete scan of the angular scanning range 54.

In the later case, a second safety test is also carried out by the computer 38 to the extent that test count pulses are transmitted to the test count pulse input 55 via the line 56 and trigger via the OR-gate 71 count procedures in the individual counters 50, 51, with this test counting, however, taking place some 300 times more slowly, for example at a frequency of 5 MHz, than is the case with the actual measurement process.

The count procedure is initiated from the computer via the control line 65, the test start input 58, the OR-gate 75, the flip-flop 76 and the AND-gate 73 in similar manner as takes place with the actual measurement process via the measurement start input 57.

A test counting process one triggered is continued until the counters 50, 51 are full, whereupon a stop signal is transmitted to the reset input 112 of the flip-flop 76 via the overflow output 107 of the second individual counter 51, the reset line 77 and the OR-gate 74. A check can now be made via the addition stage 69 and the line 109 and also via the multiplexer 68, which is controlled again by the computer 38 in suitable manner, whether the actual counts agree with the desired value.

Through the second test which is likewise only carried out once per scan, a check can be made whether the logic functions are working correctly. Since the computer 38 generates the positive and negative flanks which initiate the count at the test input 58, it can straightforwardly check by comparison of the counts that are received with the number of the transmitted flanks that the operation is taking place in troublefree manner. Logic faults and also damaged signal lines can in this way be reliably detected.

The arrangement of two individual counters 50, 51 in the counter 30 thus not only has the advantage of doubling the time resolution, but rather also enables the two above-described safety tests.

Figure 7:
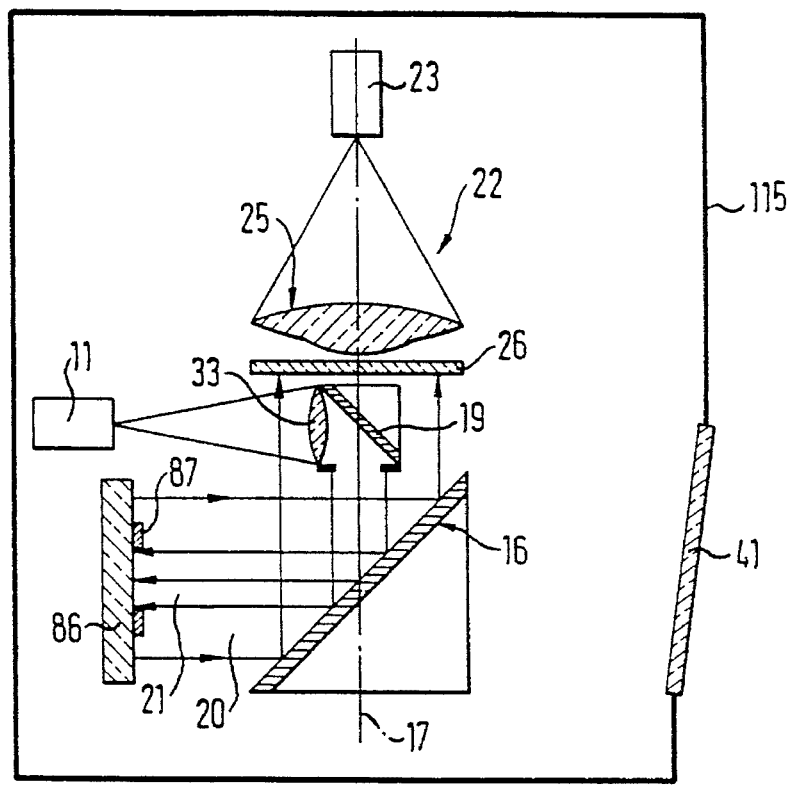
FIG. 7 is a view analogous to FIG. 1 in a position of the rotary mirror rotated through 90° in order to illustrate the function of a test body inserted into the beam path.
Figure 8:
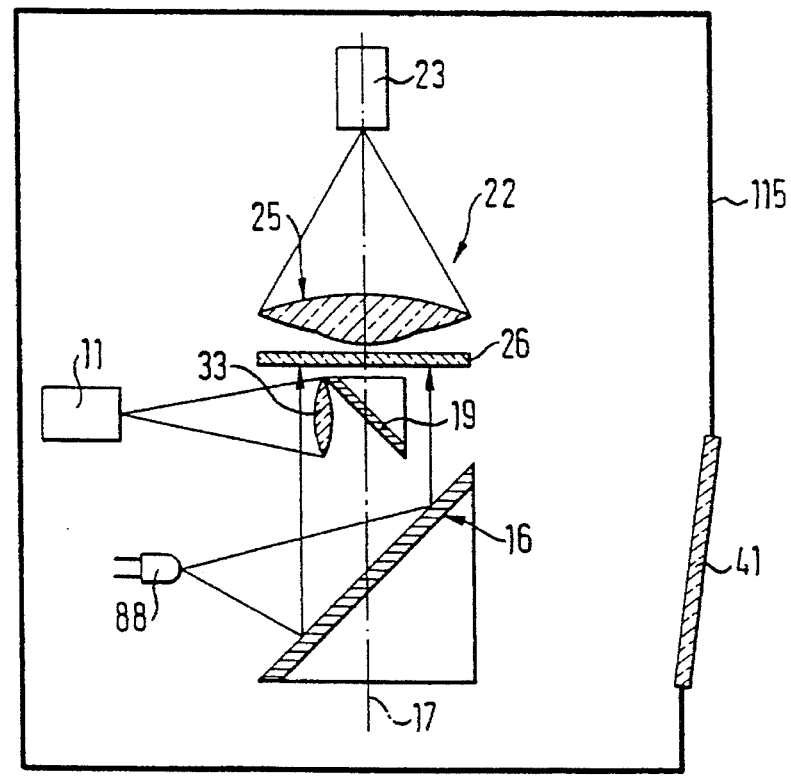
FIG. 8 is an analogous view to that of FIG. 7, with a luminous diode being shown for the testing of the reception system.

FIGS. 4 and 7 show that test devices can be arranged in that region of the 360° scan of the rotary mirror 16 which lies outside of the angular scanning range 54 (FIG. 2). One of these test devices consists of a test body 86 which is arranged in the region of the transmitted pulsed light beam 21, which can, for example, consist of a light scattering material. This can be a sintered glass disc (glass frit) in which the light is scattered at the crystalline particles. A blackened ring diaphragm 87 around the region where the transmitted pulsed light beam 21 is incident avoids undesired scattered light effects.

As the scattering characteristics of the test body 86 are known and stable, the troublefree functioning of the pulsed laser 11 and of the receiver system can be tested by evaluation of the received signal of the photoreceiver 23, which is preferably formed as an avalanche receiver diode.

The received signal Us of the photoreceiver arrangement 22 is computed in accordance with the following formula:

$$Us = Ps \cdot Rr \cdot Rq \cdot M \cdot Rt \qquad (2)$$

In this formula the abbreviations signify:
  Us: received signal
  Ps: transmitted power Rr: degree of reflection of the test object Rq: quantum efficiency M: multiplication factor of the avalanche diode 23 that is used Rt: transmission impedance of the avalanche diode 23 (effective working resistance of the diode)

The computer now checks whether the received signal Us has at least achieved the value of a preset boundary value constant K1. If this is the case then the transmitter/receiver arrangement is evaluated as troublefree and the measurement is continued. If, however, the received signal Us sinks below K1 during the predescribed test, then the computer 38 indicates an error and for example switches off the dangerous working machine 126 of FIG. 14.

Figure 9:
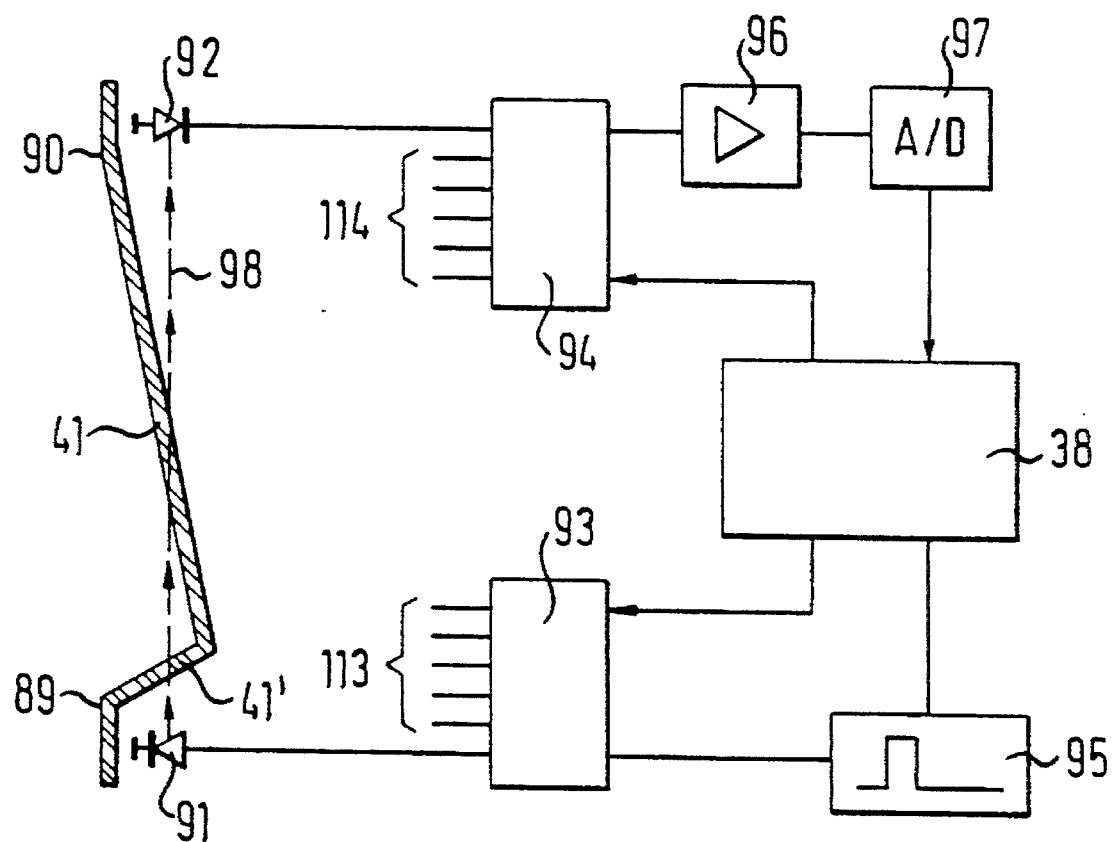
FIG. 9 is a schematic section through the front disc of an apparatus in accordance with the invention and also a light barrier arrangement serving for contamination monitoring together with the associated block circuit diagram and, FIGS. 10 to 14 show schematic plan views of different uses of the laser radar of the invention.

In accordance with FIG. 9 a further test can be carried out in the same angular range which is ineffective for the actual measurement in that a luminescent diode 88 is provided either within the test body 86 or alongside it (FIG. 4) of which an image is formed on the photoreceiver 23 via the image forming receiving system of the photoreceiver arrangement 22, which is again assumed to be an avalanche diode. The DC current I generated in the avalanche diode 23 leads, as a result of the physical laws, to quantum noise (shot noise) which is quantitatively determined via the noise level measuring device 36 (FIG. 3). An evaluation permits, with the known receiver DC-current I, the computation of the so-called excess noise index of the avalanche diode 23, which is a direct measure for the quality or operability of the avalanche diode 23. The system sensitivity under all ambient light situations can then be indirectly proved with the measurement result of the test described with respect to FIG. 7.

The noise level found by the noise level measuring device 36 is calculated in accordance with the following formula:

$$Ur=(2 \cdot g \cdot I \cdot M^{1+k} \cdot f_g)^{1/2} \cdot Rt \qquad (3)$$

The computer then checks whether the following requirement is satisfied:

$$\frac{Us(I)^{1/2}}{Ur \cdot K1} \geq \frac{1}{(2 \cdot q \cdot M^{1+k} \cdot f_g)^{1/2} \cdot Rt} = K2 \qquad (4)$$

In the above-named formulae the following abbreviations signify:

I: photo current in the photo diode 23

Ur: noise voltage as a result of the illumination by luminous diode 88

M: multiplication factor of the avalanche diode 23 q: elementary charge ($1,6 \cdot 10^{-19}$ Coulomb)

Rt: transimpedence of the avalanche diode 23

$f_g$: boundary frequency of the noise

K2: second boundary value constant

In accordance with FIGS. 4 and 9, luminescent diodes 91 are uniformly distributed beneath the lower end face 89 of the front disc 41 over the angular scanning range 54 and each send a light barrier beam 98 upwardly, which traverses an angled lower part of the front disc 41 in accordance with FIGS. 4 and 9 and then passes through the obliquely set main part of the front disc 41 to the associated photoreceiver 92 arranged above it. The oblique position of the main part of the front disc 41 not only has the sense of providing a possibility of through-passage for the vertically directed light rays 98, but rather also of keeping the inner side reflection from the front disc 41 away from the photoreceiver arrangement 22.

In accordance with the invention, the lower angled part of the front disc 41 has two matted or roughened regions 41' distributed over its outer surface by which the sharply bundled light 131 transmitted from the associated light transmitter 91 is scattered, in the absence of a smoothing oil film 128 drawn-in in Figure 4, into a substantially larger solid angular range 129, so that the associated light receiver 92 only receives a smaller quantity of light from the light transmitter 91.

If, for example, an oil film 128 is deposited onto the roughened outer surface of the matted region 41', then this cancels the strong light scattering of the beam 31 as a result of the only small difference in refractive index with respect to the lower-lying material of the front disc 41, so that now a concentrated light beam 130 is incident on the associated light receiver 92 and triggers a substantially stronger received light signal at the light receiver 92. The strong increase of the outward signal of the light receiver 92 is thus a measure of whether a smoothing liquid film has been deposited on the roughened surface of the matted region 41'.

Of the light transmitter-light receiver pairs 91, 92 distributed over the periphery of the front disc 41, a matted region 41' is associated with at least two of them in order to provide a redundancy in the event of a defect opto-electronic component.

In accordance with FIG. 9, the luminous diodes 91 are connected to a series of outputs 113 of a multiplexer 93, which is controlled from the computer 38 and fed with rectangular pulses via a pulse shaper 95.

The reception diodes 92 are connected with the various inputs 114 of a further multiplexer 94, which is likewise controlled by the computer 38 and is connected to the computer 38 via an amplifier 96 and also an analogue-digital converter 97.

The described arrangement of luminous diodes 91 and receiving diodes 92 serves to monitor the contamination of the front disc 41. This manner of operation is as follows:

The computer 38 clocks the multiplexer 93 so that it transmits rectangular pulses via the pulse shaper 95 one after the other to the transmitter diodes uniformly arranged around the periphery of the angular scanning range 54. In the same rhythm the respective oppositely disposed receiving diodes 92 are activated in that the multiplexer 94 is clocked in the same manner from the computer 38 as the multiplexer 93, whereby the outputs of the individual receiving diodes 92 are applied one after the other to the amplifier 96 and to the analogue-digital converter 97.

The computer 38 thereby continuously receives signals from the individual receiving diodes 92. By comparison of a predetermined desired reception strength with the actual reception strength of the light beams 98 the computer 38 can thus recognise contamination of the front disc 41. Should an excess contamination be recognised at at least one position, then the computer 38 indicates this to the interface 39 and it can then, for example, transmit a warning signal or a switch-off signal.

During evaluation of the received signals of the light receivers 92 which are associated with a matted region 41' the computer 38 distinguishes between a reduction and an increase of the received signal so that both a contamination which produces darkening and also an oil film in the light beam extending between the light transmitter 91 and the light transceiver 92 can be recognised. It is, however, also possible that the light transmitter-light receiver pair 91, 92 associated with the matted region 41' only serves to recognise liquid films, so that the computer 38 on switching in of such a light transmitter-light receiver pair 91, 92 only responds to an increased light reception.

In addition to the preferably four measurement light beam rays 98, two redundantly constructed reference branches should be present the beam path of which does not lead through the disc, whereby the temperature dependent behaviour of the transmitter diodes and also of the pulse current source can be eliminated by corresponding signal comparison in the computer 38. Through two-channel construction of the reference branches, the circuit is so laid-out that every faulty function is discovered.

Furthermore, the speed of rotation of the motor and the system timing is monitored by the computer in accordance with the invention. A temporal and logic monitoring of the running of the program takes place.

The monitoring of the electronic functions takes place in accordance with the invention by a RAM-,ROM-, ALU-, Watchdog-test, A/D-Converter (Contamination measurement, noise level measurement), D/A-converter (comparator test), peak value detector, stop comparator and oscillators for the computer 38 and 1.5 GHz-counter.

In accordance with the invention two optically decoupled, dynamic, back-read interference lines are provided. The proof of the system management is based on a worst-case performance balance. A single error safe control of the laser (eye safety) takes place. Furthermore, access protection for the setting-up mode can be achieved by passwords. A recognition of contamination and contamination warning is ensured through the described light grid.

A defined start-up behaviour of the system or of the interface is present. After switching on of the apparatus, all the above-named tests are run through.

The sensitivity of the transmitter-receiver-arrangement is so set that objects with a degree of reflection down to 2% can be recognised.

The laser radar apparatus is accommodated in accordance with FIG. 4 in a housing 115 which is closed at the front by a cover cap 116, in the lower region of which there is provided the front disc 41 which is curved over 180°. In accordance with FIG. 4 the transmitter and receiver are accommodated in a transmitter-receiver unit 49 formed as a compact construction unit, for example in the form of a cylindrical housing.

I claim:

1. In a laser range finding apparatus utilizing pulse transit time for determining a distance of an object within a planar measurement range including;

a pulsed laser which controllably sends light pulses of predetermined pulse duration along a vertical axis for deflection into a planar measurement region;

a photoreceiver arrangement which receives the light pulses reflected back from an object located in the measurement region;

an evaluation circuit which derives a distance signal characteristic for the distance of the object from the pulsed laser from the pulse transit time between the transmission and reception of a light pulse utilizing the speed of light;

a light deflecting device is arranged between the measurement region and the pulsed laser for deflecting sequential light pulses with angular position into the measurement region;

means for simultaneously transmitting to the evaluation circuit an angular position signal representative for its instantaneous angular position operably connected to the light deflecting device; and, means connected to the evaluation circuit to derive a location of the object within the measurement range from the distance signal and the angular position signal, the improvement in the light deflecting device comprising:

a mirror mounted for rotation along a vertical axis parallel to the vertical axis of light from the pulsed laser being emitted for deflection into the measurement region;

the plane of rotation of the mirror parallel with respect to the planar measurement region;

the mirror angularly inclined with respect to the plane of rotation and the vertical axis to cause pulsed light from the laser to be diverted over the planar measurement field and reflected light from the measurement region to be received from the planar measurement region and diverted along a vertical path;

the mirror for deflecting pulsed light from the laser into the measurement region and for receiving reflected light from the measurement region and direction the received light to the photoreceiver arrangement.

2. In a laser range finding apparatus utilizing pulse transit time for determining a distance of an object within a measurement range according to claim 1 and further comprising:

the mirror having a central region for deflecting pulsed light from the laser into the measurement region and a peripheral region for receiving reflected light from the measurement region;

first optical path means for directing pulsed light to the central portion of the mirror; and, second optical path means for directing the received light from the peripheral portion of the mirror to the photoreceiver arrangement.

3. In a laser range finding apparatus utilizing pulse transit time for determining a distance of an object within a measurement range according to claim 1 and further comprising:

the light deflecting device having an angular scanning range greater than 90°, and smaller than 270°.

4. In a laser range finding apparatus utilizing pulse transit time for determining a distance of an object within a measurement range according to claim 2 and further comprising:

the light deflecting device having an angular scanning range preferably amounting to about 180°.

5. In a laser range finding apparatus utilizing pulse transit time for determining a distance of an object within a measurement range according to claim 1 and further comprising:

the predetermined pulse duration of the light pulse is short relative to deflection between the sequential light pulses of the light deflecting device enabling the light deflecting device to be approximated as stationary by the evaluation circuit.

6. In a laser range finding apparatus utilizing pulse transit time for determining a distance of an object within a measurement range according to claim 1 and further comprising:

the light pulse duration amounts to between 1–5 nanoseconds.

7. In a laser range finding apparatus utilizing pulse transit time for determining a distance of an object within a measurement range according to claim 1 and further comprising:

the light deflecting device has an angular speed of $0.5 \times 10^4$ to $2 \times 10^{4\circ}$ C./sec.

8. In a laser range finding apparatus utilizing pulse transit time for determining a distance of an object within a measurement range according to claim 1 and further comprising:

the pulsed laser emits sequential transmitted light pulses between 5 to 50 kHz.

9. In a laser range finding apparatus utilizing pulse transit time for determining a distance of an object within a measurement range according to claim 1 and further comprising:

the pulsed laser includes a transmitter lens forming a parallel transmitted pulsed light beam is inserted in front of the pulsed laser.

10. In a laser range finding apparatus utilizing pulse transit time for determining a distance of an object within a measurement range according to claim 1 and further comprising:

a deflecting mirror for the pulsed light coming from the pulsed laser is arranged opposite to the rotary mirror and the received pulsed light beam passes past the deflecting mirror to the photoreceiver arrangement.

11. In a laser range finding apparatus utilizing pulse transit time for determining a distance of an object within a measurement range according to claim 1 and further comprising:

the photoreceiver arrangement includes a receiver lens which concentrates the received light onto a photoreceiver.

12. In a laser range finding apparatus utilizing pulse transit time for determining a distance of an object within a measurement range according to claim 11 and further comprising:

the diameter of the receiver lens is so large that it picks up the received pulsed light beam incident on the peripheral region of the rotary mirror adjacent the central region.

13. In a laser range finding apparatus utilizing pulse transit time for determining a distance of an object within a measurement range according to claim 1 and further comprising:

an interference filter tuned to the spectrum of the light transmitted by the pulsed laser is arranged at the input of the photoreceiver arrangement.

14. In a laser range finding apparatus utilizing pulse transit time for determining a distance of an object within a measurement range according to claim 11 and further comprising:

the receiver lens has two regions with different focal lengths which are preferably disposed concentrically to one another.

15. In a laser range finding apparatus utilizing pulse transit time for determining a distance of an object within a measurement range according to claim 1 and further comprising:

the mirror is formed at an oblique cutting plane of a right cylindrical body, a cylinder axis of which coincides with the axis of rotation.

16. In a laser range finding apparatus utilizing pulse transit time for determining a distance of an object within a measurement range according to claim 1 and further comprising:

the light deflecting device sweeps through a 360° deflection angle, and continuously rotates in one direction of rotation.

17. In a laser range finding apparatus utilizing pulse transit time for determining a distance of an object within a measurement range according to claim 1 and further comprising:

the rotary mirror is arranged on a rotary plate which is driven by a motor to a continuous rotation with a preferably preset speed of rotation between 1000 to 3000 r.p.m.

18. In a laser range finding apparatus utilizing pulse transit time for determining a distance of an object within a measurement range according to claim 17 and further comprising:

an angle transducer is arranged in the region of the rotary plate which indicates the instantaneous angular position of the rotary plate to the evaluation circuit.

19. In a laser range finding apparatus utilizing pulse transit time for determining a distance of an object within a planar measurement range including;

a pulsed laser which controllably sends light pulses of predetermined pulse duration along a vertical axis for deflection into a planar measurement region;

a photoreceiver arrangement which receives the light pulses reflected back from an object located in the measurement region;

an evaluation circuit which derives a distance signal characteristic for the distance of the object from the pulsed laser from the pulse transit time between the transmission and reception of a light pulse utilizing the speed of light;

a light deflecting device is arranged between the measurement region and the pulsed laser for deflecting sequential light pulses with angular position into the measurement region;

means for simultaneously transmitting to the evaluation circuit an angular position signal representative for its instantaneous angular position operably connected to the light deflecting device; and, means connected to the evaluation circuit to derive a location of the object within the measurement range from the distance signal and the angular position signal, the improvement in the light deflecting device comprising:

the evaluation circuit includes a counter with a preferably fixedly preset clock frequency connected to the counter;

means for triggering the counter to count with the pulsed laser on transmission of a light pulse; and, means for stopping the counter with the photoreceiver arrangement on reception of the same light pulse by the photoreceiver arrangement.

20. In a laser range finding apparatus utilizing pulse transit time for determining a distance of an object within a measurement range according to claim 19 and further comprising:

the counter is acted on by a frequency generator which preferably operates with a clock frequency of 0.5 to 3.0 GHz.

21. In a laser range finding apparatus utilizing pulse transit time for determining a distance of an object within a measurement range according to claim 19 and further comprising:

the counter is built up of two asynchronous individual counters of which one responds to the positive half waves and the other responds to the negative half waves of a hyper frequency voltage generated by the frequency generator.

22. In a laser range finding apparatus utilizing pulse transit time for determining a distance of an object within a measurement range according to claim 21 and further comprising:

means for the individual counts of the two counters generated by the transit time of a light pulse to be added and used as a measure for the transit time.

23. In a laser range finding apparatus utilizing pulse transit time for determining a distance of an object within a measurement range according to claim 22 and further comprising:

means for generating the comparison of the sum of the individual counts of the counters with twice the count of one of the individual counters and generating a fault signal when a comparison results in a difference of more than a predetermined number of bits.

24. In a laser range finding apparatus utilizing pulse transit time for determining a distance of an object within a measurement range according to claim 23 and further comprising:

means for generating the comparison after each evaluation of a light pulse.

25. In a laser range finding apparatus utilizing pulse transit time for determining a distance of an object within a measurement range according to claim 23 and further comprising:

means for generating the comparison in the pause between the end of one scanning of the angular scanning range and the start of the next scanning of the angular scanning range.

26. In a laser range finding apparatus utilizing pulse transit time for determining a distance of an object within a measurement range according to claim 23 and further comprising:

means for generating the comparison in the pause between two scans of the angular scanning range wherein the computer delivers controlled counting pulses to the individual counters, checks the results of the count, and transmits a fault signal when the result of the count does not correspond with the input number of count pulses.

27. In a laser range finding apparatus utilizing pulse transit time for determining a distance of an object within a measurement range according to claim 19 and further comprising:

the photoreceiver arrangement is applied via a comparator to the counter;

a reference input defines the trigger threshold for the received signals.

28. In a laser range finding apparatus utilizing pulse transit time for determining a distance of an object within a measurement range according to claim 27 and further comprising:

a noise level meter continuously detects the brightness via the photoreceiver arrangement and averages it to an average value over a predetermined time which is large relative to the duration of a light pulse and smaller relative to the time between two sequential transmitter light pulses and this average value is used as the average noise level.

29. In a laser range finding apparatus utilizing pulse transit time for determining a distance of an object within a measurement range according to claim 28 and further comprising:

the average value formation time amounts to approximately 30% of the time spacing of two neighboring transmitted light pulses.

30. In a laser range finding apparatus utilizing pulse transit time for determining a distance of an object within a measurement range according to claim 28 and further comprising:

means for stopping the counter includes a trigger threshold; and, the trigger threshold specified by the output signal of the noise level meter is multiplied 2 to 10 times larger than the mean noise level which has been detected.

31. In a laser range finding apparatus utilizing pulse transit time for determining a distance of an object within a planar measurement range including;

a pulsed laser which controllably sends light pulses of predetermined pulse duration along a vertical axis for deflection into a planar measurement region;

a photoreceiver arrangement which receives the light pulses reflected back from an object located in the measurement region;

an evaluation circuit which derives a distance signal characteristic for the distance of the object from the pulsed laser from the pulse transit time between the transmission and reception of a light pulse utilizing the speed of light;

a light deflecting device is arranged between the measurement region and the pulsed laser for deflecting sequential light pulses with angular position into the measurement region;

means for simultaneously transmitting to the evaluation circuit an angular position signal representative for its instantaneous angular position operably connected to the light deflecting device; and, means connected to the evaluation circuit to derive a location of the object within the measurement range from the distance signal and the angular position signal, the improvement in the light deflecting device comprising:

a peak value detector is also connected to the output of the photoreceiver arrangement, the output signal of which is used to generate correction values for a compensation of a time measurement error.

32. In a laser range finding apparatus utilizing pulse transit time for determining a distance of an object within a measurement range according to claim 31 and further comprising:

the peak value detector detects the respective maximum of a received light pulse and transmits a corresponding maximum signal to a computer.

33. In a laser range finding apparatus utilizing pulse transit time for determining a distance of an object within a planar measurement range including;

a pulsed laser which controllably sends light pulses of predetermined pulse duration along a vertical axis for deflection into a planar measurement region;

a photoreceiver arrangement which receives the light pulses reflected back from an object located in the measurement region;

an evaluation circuit which derives a distance signal characteristic for the distance of the object from the pulsed laser from the pulse transit time between the transmission and reception of a light pulse utilizing the speed of light;

a light deflecting device is arranged between the measurement region and the pulsed laser for deflecting sequential light pulses with angular position into the measurement region;

means for simultaneously transmitting to the evaluation circuit an angular position signal representative for its instantaneous angular position operably connected to the light deflecting device; and, means connected to the evaluation circuit to derive a location of the object within the measurement range from the distance signal and the angular position signal, the improvement in the light deflecting device comprising:

a light scattering test body is arranged outside of the angular position of the light deflecting device;

said light scatter test body having an scattering angle sufficient to cause light from said pulsed laser to said evaluation circuit for verifying operation said laser and evaluation circuit.

34. In a laser range finding apparatus utilizing pulse transit time for determining a distance of an object within a measurement range according to claim 1 and further comprising:

a luminescent diode is arranged in a path of the transmitted pulsed light beam executing a scanning movement outside of the angular scanning range; and, a computer includes means for checking during the sweeping over of the luminous diode by a region of a rotary mirror corresponding to the received pulsed light beam whether the signal/noise ratio is at least the same as a predetermined boundary value.

35. In a laser range finding apparatus utilizing pulse transit time for determining a distance of an object within a planar measurement range including;

a pulsed laser which controllably sends light pulses of predetermined pulse duration along a vertical axis for deflection into a planar measurement region;

a photoreceiver arrangement which receives the light pulses reflected back from an object located in the measurement region;

an evaluation circuit which derives a distance signal characteristic for the distance of the object from the pulsed laser from the pulse transit time between the transmission and reception of a light pulse utilizing the speed of light;

a light deflecting device is arranged between the measurement region and the pulsed laser for deflecting sequential light pulses with angular scanning range into the measurement region;

means for simultaneously transmitting to the evaluation circuit an angular position signal representative for its instantaneous angular position operably connected to the light deflecting device; and, means connected to the evaluation circuit to derive a location of the object within the measurement range from the distance signal and the angular position signal, the improvement in the light deflecting device comprising:

a front disc of curved shape around the axis of rotation extends in the scanning direction at least over the angular scanning range.

36. In a laser range finding apparatus utilizing pulse transit time for determining a distance of an object within a measurement range according to claim 35 and further comprising:

the front disc is crossed at a plurality of points along its periphery by beams of light barriers which emerge from light transmitters arranged in the region of an end face; and, light receivers receive arranged in the region of an opposite end face of the front disc the beams.

37. In a laser range finding apparatus utilizing pulse transit time for determining a distance of an object within a measurement range according to claim 36 and further comprising:

the light transmitters and the light receivers are connected to a computer via multiplexers for the sequential control with pulses and for the corresponding evaluation of the received pulses respectively, with the computer transmitting a contamination signal when at least one received signal has dropped below a predetermined minimum value.

38. In a laser range finding apparatus utilizing pulse transit time for determining a distance of an object within a measurement range according to claim 36 and further comprising:

the front disc extends obliquely from the top downward in the direction towards the rotary mirror and is preferably angled at its lower end.

39. In a laser range finding apparatus utilizing pulse transit time for determining a distance of an object within a measurement range according to claim 36 and further comprising:

at least one region of the front disc which is preferably located closer to the light transmitter and more remote from an associated light receiver is of mat design on its outer surface, such that the associated light receiver receives a quantity of light which has been attenuated by the light scattering when the region is non-contaminated and receives an increased quantity of light in the presence of a liquid film to transmit a contamination signal when the light reception at the associated light receiver exceeds a predetermined value.

40. In a laser range finding apparatus utilizing pulse transit time for determining a distance of an object within a measurement range according to claim 37 and further comprising:

there are present on the front disc and distributed over its periphery two mat regions and light transmitters and light receivers associated therewith.

41. In a laser range finding apparatus utilizing pulse transit time for determining a distance of an object within a planar measurement range including;

a pulsed laser which controllably sends light pulses of predetermined pulse duration along a vertical axis for deflection into a planar measurement region;

a photoreceiver arrangement which receives the light pulses reflected back from an object located in the measurement region;

an evaluation circuit which derives a distance signal characteristic for the distance of the object from the pulsed laser from the pulse transit time between the transmission and reception of a light pulse utilizing the speed of light;

a light deflecting device is arranged between the measurement region and the pulsed laser for deflecting sequential light pulses with angular position into the measurement region;

means for simultaneously transmitting to the evaluation circuit an angular position signal representative for its instantaneous angular position operably connected to the light deflecting device; and, means connected to the evaluation circuit to derive a location of the object within the measurement range from the distance signal and the angular position signal, the improvement in the light deflecting device comprising:

a mirror mounted for rotation along a vertical axis parallel to the vertical axis of light from the pulsed laser being emitted for deflection into the measurement region;

the plane of rotation of the mirror parallel with respect to the planar measurement region;

the mirror angularly inclined with respect to the plane of rotation and the vertical axis to cause pulsed light from the laser to be diverted over the planar measurement field and reflected light from the measurement region to be received from the planar measurement region and diverted along a vertical path;

the mirror for deflecting pulsed light from the laser into the measurement region and for receiving reflected light from the measurement region and direction the received light to the photoreceiver arrangement;

a light scattering test body is arranged outside of the angular position of the light deflecting device; and, said light scatter test body having an scattering angle sufficient to cause light from said pulsed laser to said evaluation circuit for verifying operation said laser and evaluation circuit.

42. In a laser range finding apparatus utilizing pulse transit time for determining a distance of an object within a measurement range according to claim 41 and further comprising:

the light deflecting device sweeps through a 360° deflection angle, and continuously rotates in one direction of rotation.

43. In a laser range finding apparatus utilizing pulse transit time for determining a distance of an object within a planar measurement range including;

a pulsed laser which controllably sends light pulses of predetermined pulse duration along a vertical axis for deflection into a planar measurement region;

a photoreceiver arrangement which receives the light pulses reflected back from an object located in the measurement region;

an evaluation circuit which derives a distance signal characteristic for the distance of the object from the pulsed laser from the pulse transit time between the transmission and reception of a light pulse utilizing the speed of light;

a light deflecting device is arranged between the measurement region and the pulsed laser for deflecting sequential light pulses with an angular scanning range into the measurement region;

means for simultaneously transmitting to the evaluation circuit an angular position signal representative for its instantaneous angular position operably connected to the light deflecting device; and, means connected to the evaluation circuit to derive a location of the object within the measurement range from the distance signal and the angular position signal, the improvement in the light deflecting device comprising:

a luminescent diode is arranged in a path of the transmitted pulsed light beam executing a scanning movement outside of the angular scanning range; and, a computer includes means for checking during the sweeping over of the luminous diode by a region of a rotary mirror corresponding to the received pulsed light beam whether the signal/noise ratio is at least the same as a predetermined boundary value.

44. In a laser range finding apparatus utilizing pulse transit time for determining a distance of an object within a measurement range according to claim 43 and further comprising:

the light deflecting device sweeps through a 360° deflection angle, and continuously rotates in one direction of rotation.

* * * * *